UNITED STATES PATENT OFFICE.

FREDERICK B. LA FORGE, OF WASHINGTON, DISTRICT OF COLUMBIA.

PROCESS OF MANUFACTURING AN ADHESIVE MATERIAL.

1,285,247. Specification of Letters Patent. Patented Nov. 19, 1918.

No Drawing. Application filed April 13, 1918. Serial No. 228,385.

(DEDICATED TO THE PUBLIC.)

*To all whom it may concern:*

Be it known that I, FREDERICK B. LA FORGE, a citizen of the United States of America, and an employee of the Department of Agriculture of the United States of America, residing at Washington, D. C., (whose post-office address is Department of Agriculture, Washington, D. C.,) have invented a new and useful Process of Manufacturing an Adhesive Material.

This application is made under the act of March 3, 1883, chapter 143 (22 Stat. 625), and the invention herein described and claimed may be used by the Government of the United States, or any of its officers or employees, in the prosecution of work for the Government, or any person in the United States, without payment to me of any royalty thereon.

My invention relates to the production from corn cobs of a colloidal material, useful as an adhesive.

In the practice of my invention, the cobs are placed in a suitable closed vessel and a suitable quantity of water is added thereto. The contents of the container are then heated to a sufficient temperature, preferably 140° to 150°, to cause the separation and solution of all or a portion of the colloidal matter from insoluble residue of the corn cobs. The solution of the colloidal material in water is then removed from the insoluble residue by pressure or other suitable means and the product obtained thereby is concentrated to the desired consistency, whereupon the adhesive is ready for use.

The following experiment may serve as a typical example:

One and one-half kilograms of broken corn cobs are heated in an auto clave with three and one-half liters of water for one hour at a temperature of 140°–150° C. The temperature is raised to 140° C. as quickly as possible and then slowly brought up to 150° C. during one hour. The heating is then discontinued, the auto clave cooled and the contents removed. The next operation involves the extraction of that part of the liquid which has been absorbed by the solid residue of the corn cobs. This object is accomplished by subjecting the material to heavy pressure. The liquid which has thus been pressed out of the solid residue is next evaporated in an open kettle to the consistency desired, which is about 32° Bé. The resulting syrup constitutes the adhesive and is ready for use as such at once.

Having thus described my invention, I claim:

The process of making an adhesive consisting in heating corn cobs under pressure in water to cause separation and solution of colloidal material from insoluble residue of the corn cobs, in separating by pressure the colloidal solution from the insoluble residue, and then in concentrating the resulting solution to the consistency of a thick syrup.

In testimony whereof, I affix my signature in the presence of two subscribing witnesses.

FREDERICK B. LA FORGE.

Witnesses:
L. S. HULBERT,
ARTHUR J. DECKER.